United States Patent [19]

Little et al.

[11] Patent Number: 4,758,109
[45] Date of Patent: Jul. 19, 1988

[54] SHEAR JOINT FOR YOKE

[75] Inventors: Philip J. Little, South Milwaukee; Orville C. Kocher, II, Campbellsport, both of Wis.

[73] Assignee: Weasler Engineering, Inc., West Bend, Wis.

[21] Appl. No.: 941,496

[22] Filed: Dec. 15, 1986

[51] Int. Cl.$^4$ .............................................. F16D 9/00
[52] U.S. Cl. .......................................... 403/2; 403/21; 403/337; 464/33
[58] Field of Search ............... 403/2, 21, 22, 337; 464/33, 135

[56] References Cited

FOREIGN PATENT DOCUMENTS

| 2533272 | 3/1984 | France ............................... 403/21 |
| 1216426 | 12/1970 | United Kingdom ................ 403/337 |
| 647474 | 2/1979 | U.S.S.R. ............................... 403/337 |

OTHER PUBLICATIONS

"Bondioli & Pavesi PTO Drive Shaft Catalogue 614", pp. 30 and 33, 1984, of Bondioli & Pavesi, Inc., 104 Sycamore Drive, Ashland, Va. 23005.
"Walterscheid Technical Manual 333/I USA PTO Drive Shafts and Overload Clutches for Agricultural Machinery and Special Power Transmissions", undated, admitted prior art.
"La Magdalena, S. L. General Catalogue", undated, admitted prior art.
"G & G Mfg. Co. Catalog No. 814", p. 2, undated, admitted prior art, of G & G Mfg. Co., Omaha, NE 68112.

Primary Examiner—Andrew V. Kundrat
Attorney, Agent, or Firm—Quarles & Brady

[57] ABSTRACT

A shear joint for torsionally connecting a hub to a yoke for a universal joint includes a shear bolt of a certain length extending through a flange of the hub into a radially disposed T-shaped slot in a flange of the yoke. A nut is inserted into the lateral leg of the T-shaped slot and is tightened onto the bolt by turning the bolt to hold the yoke and hub together axially and torsionally. If a bolt longer than the proper length is used to repair the joint, it abuts the top of the T-shaped slot and prevents holding the yoke and hub together by tightening the bolt, thereby encouraging use of a bolt of the proper size.

6 Claims, 2 Drawing Sheets

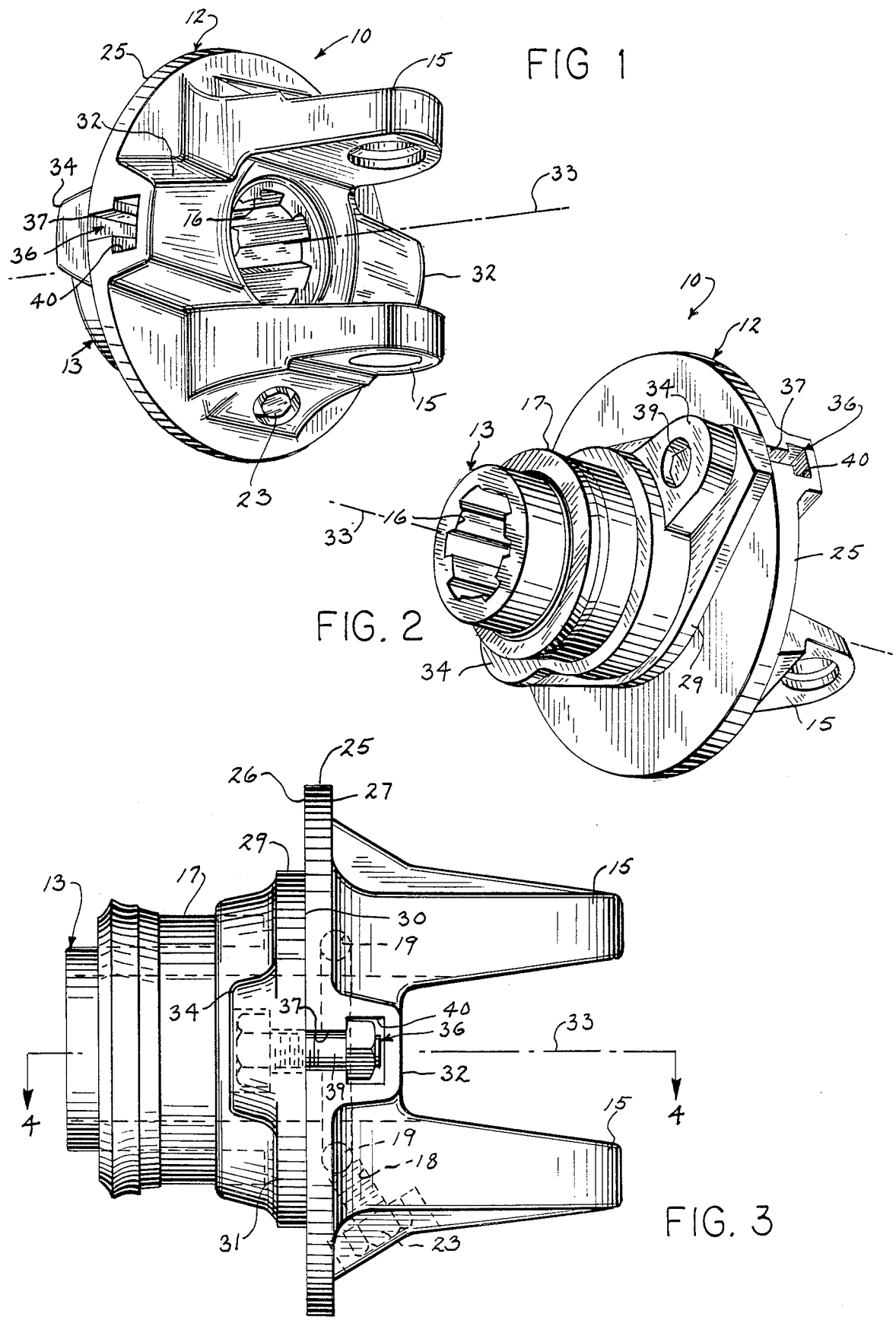

SHEAR JOINT FOR YOKE

FIELD OF THE INVENTION

This invention relates to a shear joint for transmitting torque between a hub and a yoke of a universal joint.

BACKGROUND OF THE INVENTION

Yokes for universal joints in which torque is transmitted between a hub and the yoke by a bolt loaded in shear are well known. In such yokes, the bolt extends through the hub and the yoke parallel to the axis of rotation and offset therefrom. If the torque capacity of the yoke is exceeded, the bolt fails by being sheared off and the hub and yoke are then free to rotate independent of one another.

In prior yokes, the bolt normally extended beyond the hub or yoke. Even if the yoke was originally provided with a bolt that did not extend too far beyond the surfaces of the hub and yoke, once sheared, the bolt was often replaced with any convenient length, even if longer than the original bolt. Such bolts become positively driven projections in service as they can catch clothing or human parts and generally create a hazard.

SUMMARY OF THE INVENTION

This invention provides a shear joint for torsionally coupling a hub element to a yoke element with a shear bolt and an associated nut which eliminates a shear bolt as a positively driven projection and hampers improper repair using an excessively long bolt. One of the elements has means for capturing the head of the bolt against movement toward the other element with the bolt offset radially from and parallel to the rotational axis of the assembly. The other element has a first passage which opens toward the one element to receive the bolt. A second passage adjoins the first passage and is laterally larger than the first passage to define a shoulder facing away from the one element, the second passage being sized to receive a nut for the bolt with the nut tightening against the shoulder to draw the elements together. A stop means proximate to and facing the end of the bolt is provided which abuts the end of the bolt if an excessively long bolt is used to repair the joint. If such a bolt is used, it will not be possible to tightly connect the elements to one another, thereby discouraging use of an excessively long bolt.

Preferably, a T-shaped slot defines the first and second passages, the first passage being the longitudinal leg of the "T", the second passage being the lateral leg of the "T", and the stop means being the top of the "T" opposite from the end of the bolt. The slot extends radially from where it is in alignment with the bolt to the outer perimeter of the other element. The nut can be inserted into the outer end of the second passage for engagement with the bolt.

In a second embodiment, the first passage is a bore through the other element and the second passage is a recess surrounding the bore on the side of the other element opposite from the one element. The stop means in this embodiment comprises a member covering the recess over the bore, the recess having an uncovered open portion into which the nut can be inserted for engagement with the bolt. By making the bore oblong, after the bolt is sheared, the nut and remaining severed portion of the bolt in the nut can be removed from the bore.

In an especially preferred form, the one element is the hub and the other element is the yoke. By connecting the hub to the driving shaft, when the bolt shears, the yoke and the portion of the drive line connected to the yoke stops abruptly. By so stopping, centrifugal force tending to throw the nut and severed bolt out of the T-shaped slot is curtailed.

It is a principal object of the invention to provide a shear joint for torsionally connecting a yoke element to a hub element which reduces the risk of a shear bolt as a positively driven projection in the assembly.

It is another object of the invention to provide such a joint which hampers improper repair so as to avoid the shear bolt projecting from the repaired assembly.

It is another object of the invention to provide such a joint that can be economically manufactured.

It is another object of the invention to provide such a joint in a yoke/hub assembly especially adapted for connection to the power take off shaft of an agricultural tractor.

It is another object of the invention to provide such a joint that can be easily and economically repaired using a commonly available shear bolt and nut.

These and other objects and advantages of the invention will become apparent from the drawings, described below, and from the detailed description.

DESCRIPTION OF THE DRAWINGS

FIG. 1 is a front perspective view of a yoke including a shear joint of the invention;

FIG. 2 is a rear perspective view of the yoke of FIG. 1;

FIG. 3 is a side elevation view of the yoke of FIG. 1;

DETAILED DESCRIPTION OF THE PREFERRED EMBODIMENTS

Figure 4:
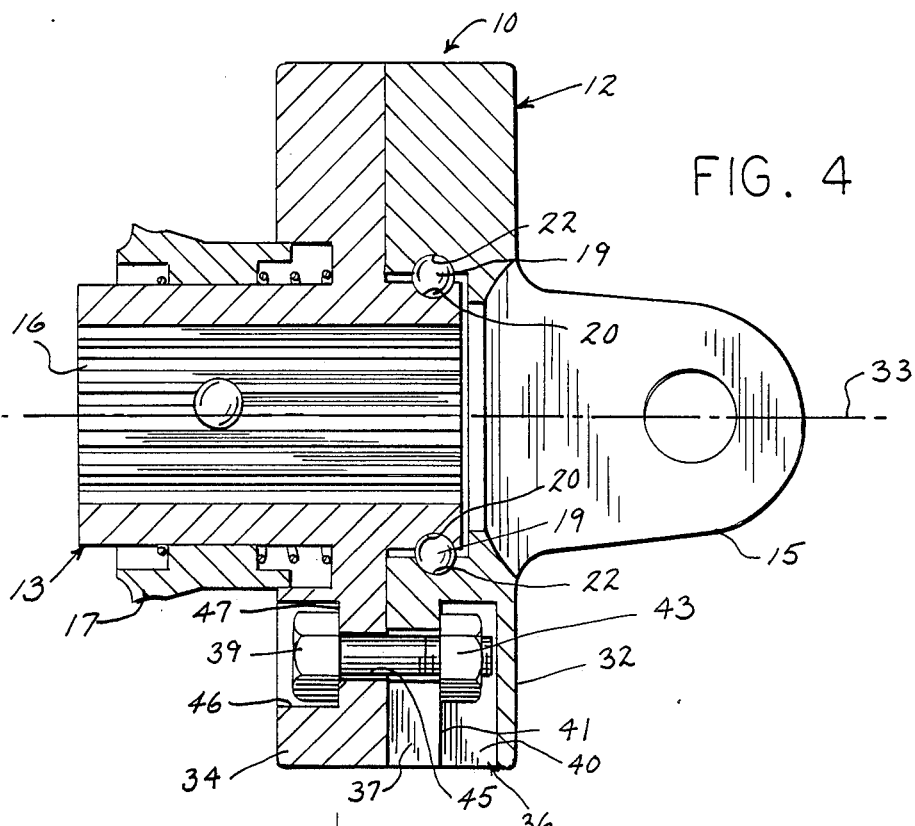
FIG. 4 is a sectional view from the plane of the line 4—4 of FIG. 3.

Referring to FIG. 1, a yoke assembly 10 is illustrated which includes a shear joint of the invention. The yoke assembly 10 includes a yoke 12 and a hub 13. The yoke 12 has a pair of arms 15 which are adapted for connection to a cross or spider (not shown) of a universal joint as is well known in the art. The hub 13 has internal splines 16 for engagement with a drive or driven shaft, such as the power take-off shaft of an agricultural tractor. A locking collar 17 is also provided on the hub 13 to hold the hub axially on the drive or driven shaft as is well known.

Referring to FIGS. 3 and 4, the yoke and hub are held axially together by a ball bearing connection. Ball bearings 19 are loaded through a threaded bore 18 in the yoke 12 until a raceway defined by an inner raceway 20 in the hub and an outer raceway 22 in the yoke is filled. A capscrew 23 is then screwed into the bearing fill bore 18 to hold the bearings in place. This connection holds the hub and yoke together axially, although with some looseness, and also allows them to rotate relative to one another.

The yoke 12 has a circular flange 25 having a hub side 26 facing the hub 13 and a yoke side 27 facing the arms 15. The hub 13 also has a flange 29 having a yoke side 30 against the yoke and a hub side 31 opposite from the yoke.

On the yoke side of the flange 25 a raised rib 32 is defined which extends radially from and on each side of the rotational axis 33 of the assembly. The hub flange 29 also has a raised rib 34 which extends radially from each side of the rotational axis 33.

One side of the raised rib 32 has a T-shaped slot 36 machined in it radially from the radially outer periphery of the yoke 12. The longitudinal leg of the T-shaped slot 36 defines a first passage 37, the width of which is slightly larger than the shank of a bolt 39 which extends through and beyond the first passage 37. The lateral leg of the "T" is laterally larger than the first passage and defines a shoulder 41 facing opposite from the hub 13. The second passage 40 is sized to receive a nut and is inserted into the radially outer end of the slot 36 and is in threaded engagement with the bolt 39. The second passage 40 is sized such that the nut 43 cannot be turned in it and therefore turning the bolt 39 clockwise as viewed from the hub side of the assembly tightens the nut against the shoulder 41 to draw the hub 13 and the yoke 12 tightly together.

The bolt 39 is inserted into the T-shaped slot 36 through a bore 45 slightly larger than the bolt shank and through a counterbore 46 through the flange 29. The counterbore 46 is sized to receive a socket for tightening the bolt head. A shoulder 47 defined between the counterbore 46 and bore 45 captures the head of the bolt against the movement toward the yoke so that tightening the bolt draws the hub 13 and yoke 12 together.

The bolt 39 is offset radially from and is parallel to the rotational axis 33 of the yoke assembly 10. Torque is transmitted between the hub 13 and yoke 12 through the bolt 39. If an excessive torque is applied to the yoke 12 or hub 13, the bolt 39 fails in shear so that the yoke 12 and hub 13 may rotate independent of one another.

It should be appreciated that the bolt 39 does not extend beyond the outer surfaces of the hub and yoke 12. This is desirable as it has been found in prior designs that the bolt extending beyond the hub or yoke creates a positively driven projection which can catch an operator's clothes or limbs and thereby create a hazard.

Furthermore, when the bolt 39 fails, it will be necessary to replace it with a bolt of the same or slightly shorter length. If the repair is attempted with a longer bolt, the bolt will be stopped by the top of the "T" opposite from the end of the bolt. The nut 43 will tighten against the shoulder 41, but the bolt 39 will not draw the hub and yoke tightly together. The hub and yoke will be only relatively loosely by the ball bearing connection and the repair man will recognize this as an unacceptable repair. Hence, the assembly can only be repaired with a bolt of the same or slightly shorter length so that after the repair, the bolt will not constitute a positively driven projection. Of course, so as not to tempt the repairman to improperly repair the assembly with a bolt of the wrong size, the bolt 39 should be chosen to be a common easily obtained part.

It is noted that a longer bolt could possibly be used if the direction of the bolt were reversed with the head of the bolt in the second passage 40 and the nut in the counter sink 46. However, because the bolt could not be slid into the key slot with the yoke assembled to the hub, reversing the direction of the bolt would require removing all the ball bearings, separating the hub and yoke, and reassembling the hub and yoke with the bolt extending through the bore 45. The additional inconvenience of doing this would likely outweigh the inconvenience of using the proper sized bolt, especially if the bolt was a standard part.

Preferably, the yoke assembly 10 is installed with the hub attached to the driving shaft, as would be the normal case in installing the assembly at the tractor end of an agricultural drive line. This way, when the bolt shears, the major portion of the drive line stops rotating while only the tractor power take-off shaft and the hub continue to rotate. Also, because the yoke stops, there is no centrifugal force tending to throw the nut and severed bolt shank radially out of the "T" slot.

Figure 5:
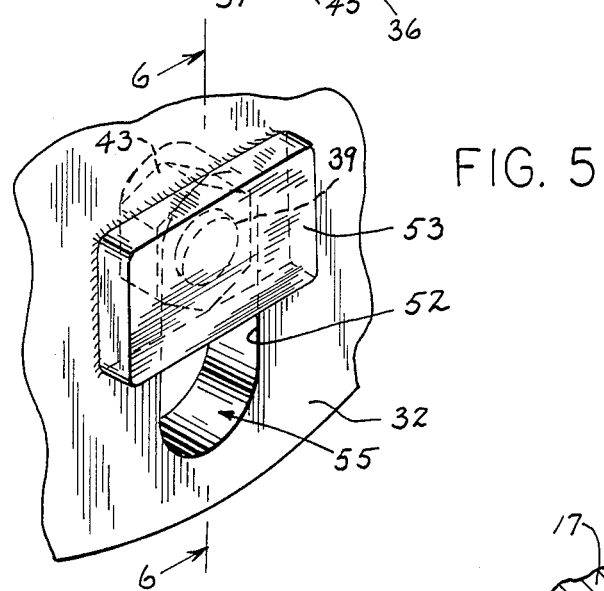
FIG. 5 is a fragmentary perspective view of a second embodiment of a joint of the invention.
Figure 6:
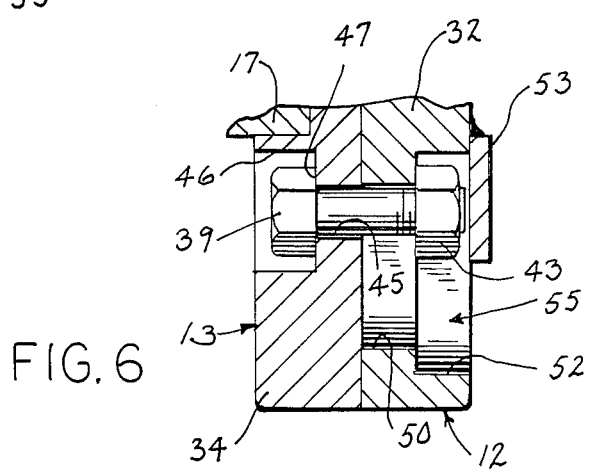
FIG. 6 is a sectional view from the plane of the line 6—6 of FIG. 5.

A second embodiment of a joint of the invention is shown in FIGS. 5 and 6. In this embodiment, rather than providing a T-shaped slot in the yoke, an oblong bore 50 is counter-sunk within one end of an oblong recess 52. A bar member 53 is welded to the yoke over the recess opposite from the oblong bore 50. The recess 52 has an uncovered open portion 55 into which the nut 43 can be inserted for engagment with the bolt 39. Upon shearing of the bolt 39, the nut 43 and severed portion of the bolt 39 threaded in the nut 43 can be moved into alignment with the open portion 55 and removed from the bore 50.

Many other modifications to the preferred embodiments but still within the scope of the invention will be apparent to those of ordinary skill in the art. For example, it may be desirable in some applications to form the T-shaped slot in the hub rather than the yoke. Also, there are many different types of hub and yoke elements used in a drive train for torsionally transmitting a load to which a joint of the invention could be applied. Therefore, it is not intended that the inventon be limited to the preferred embodiments, but that it be defined by the claims which follow.

We claim:

1. A shear joint for trsionally coupling a hub element to a yoke element with a shear bolt and an associated nut, wherein:

one of said elements has means for capturing the head of the bolt against movement toward the other element, the bolt being offset radially from and parallel to the rotational axis of the elements with the bolt shank extending beyond the one element toward the other element, said capturing means enabling the bolt head to be tightened; and the other element has (a) a first passage alignable with said bolt, said first passage opening toward the one element and being sized to receive the bolt with the bolt extending beyond the first passage, (b) a second passage adjoining the first passage which second passage is laterally larger than said first passage to define a shoulder facing away from the one element, said second passage being sized to receive a nut for the bolt with the nut tightening against the shoulder to draw the elements together, and (c) stop means proximate to and facing the end of the bolt, the second passage being accessible from the outside of the yoke to insert the nut into the second passage for engagement with the bolt;

wherein the first and second passages extend from where they are in alignment with the bolt radially to the outer perimeter of the other element, from where a nut can be inserted into the second passage for engagement with the bolt.

2. A shear joint for torsionally coupling a hub element to a yoke element with a shear bolt and an associated nut, wherein:

one of said elements has means for capturing the head of the bolt against movement toward the other element, the bolt being offset radially from and parallel to the rotational axis of the elements with the bolt shank extending beyond the one element toward the other element, said capturing means enabling the bolt head to be tightened; and the other element has (a) a first passage alignable with said bolt, said first passage opening toward the one element and being sized to receive the bolt with the bolt extending beyond the first passage, (b) a second passage adjoining the first passage which second passage is laterally larger than said first passage to define a shoulder facing away from the one element, said second passage being sized to receive a nut for the bolt with the nut tightening against the shoulder to draw the elements together, and (c) stop means proximate to and facing the end of the bolt, the second passage being accessible from outside of the yoke to insert the nut into the second passage for engagement with the bolt;

wherein the first passage is a bore through the other element and the second passage is a recess surrounding the bore on the side of the other element opposite from the one element, and the stop means comprises a member covering the recess over the bore, the recess having an uncovered open portion into which the nut can be inserted for engagement with the bolt.

3. A shear joint as in claim 2, wherein the bore is oblong shaped.

4. A shear joint for torsionally coupling a hub to a yoke with a shear bolt and an associated nut, wherein:

the hub has a flange with means for capturing the head of the bolt against movement toward the yoke, the bolt being offset radially from and parallel to the rotational axis of the hub with the bolt shank extending beyond the flange toward the yoke, said means enabling the bolt head to be tightened; and the yoke has (a) a first passage alignable with said bolt, said first passage opening toward the hub and being sized to receive the bolt with the bolt extending beyond the first passage, (b) a second passage adjoining the first passage which second passage is laterally larger than said first passage to define a shoulder facing the yoke side of the joint and sized to receive a nut for the bolt with the nut tightening against the shoulder to draw the hub and yoke together, and (c) stop means proximate to and facing the end of the bolt, the second passage being accessible from outside of the yoke to insert the nut into the second passage for engagement with the bolt;

wherein a T-shaped slot defines the first and second passages, the first passage being the longitudinal leg of the "T", the second passage being the lateral leg of the "T", and the stop means being the top of the "T" opposite from the end of the bolt; and wherein the T-shaped slot extends from where it is in alignment with the bolt radially to the outer perimeter of the yoke, from where a nut can be inserted into the second passage for engagement with the bolt.

5. A shear joint for torsionally coupling a hub to a yoke with a shear bolt and an associated nut, wherein:

the hub has a flange with means for capturing the head of the bolt against movement toward the yoke, the bolt being offset radially from and parallel to the rotational axis of the hub with the bolt shank extending beyond the flange toward the yoke, said means enabling the bolt head to be tightened; and the yoke has (a) a first passage alignable with said bolt, said first passage opening toward the hub and being sized to receive the bolt with the bolt extending beyond the first passage, (b) a second passage adjoining the first passage which second passage is laterally larger than said first passage to define a shoulder facing the yoke side of the joint and sized to receive a nut for the bolt with the nut tightening against the shoulder to draw the hub and yoke together, and (c) stop means proximate to and facing the end of the bolt, the second passage being accessible from outside of the yoke to insert the nut into the second passage for engagement with the bolt;

wherein the first passage is a bore through the yoke and the second passage is a recess surrounding the bore on the side of the yoke opposite from the hub, and the stop means comprises a member covering the recess over the bore, the recess having an uncovered open portion into which the nut can be inserted for engagement with the bolt.

6. A shear joint as in claim 5, wherein the bore is oblong shaped.

* * * * *